A. ERICKSON.
RAIL JOINT.
APPLICATION FILED OCT. 23, 1915.

1,194,283.

Patented Aug. 8, 1916.
2 SHEETS—SHEET 1.

Witness
Frederick W. Ely

Inventor
A. Erickson.
By Victor J. Evans
Attorney

A. ERICKSON.
RAIL JOINT.
APPLICATION FILED OCT. 23, 1915.
1,194,283.
Patented Aug. 8, 1916.
2 SHEETS—SHEET 2.
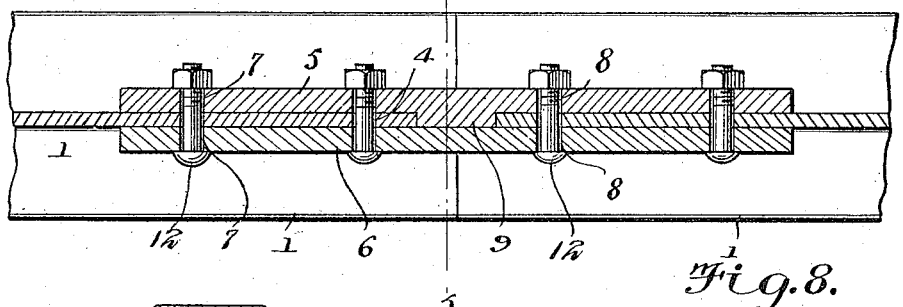
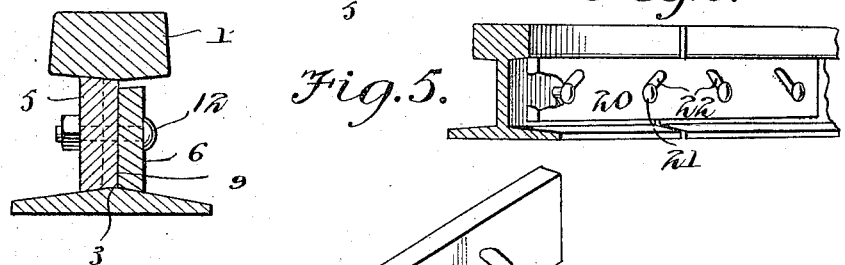
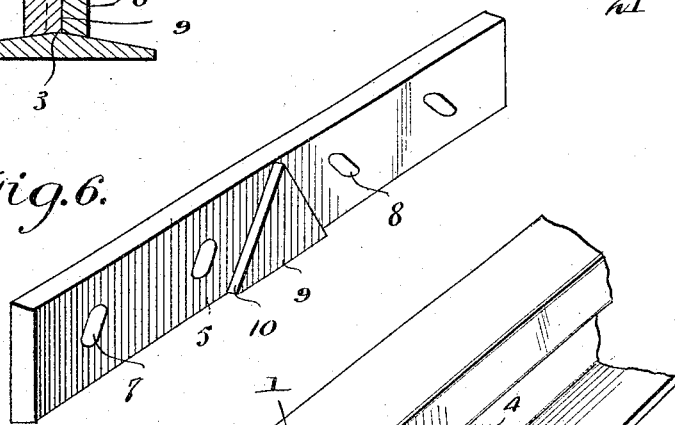
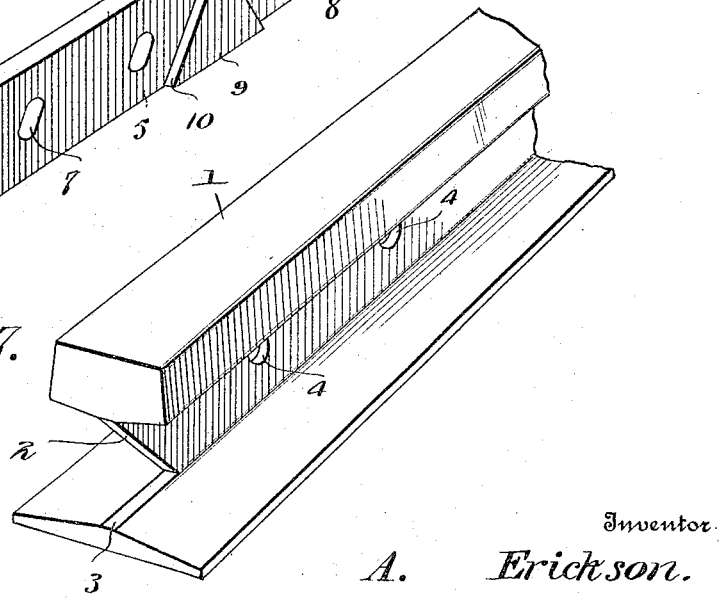
Witnesses
Frederick W. Ely.
Inventor
A. Erickson.
By Victor J. Evans
Attorney

UNITED STATES PATENT OFFICE.

ALGOT ERICKSON, OF LOWELL, INDIANA.

RAIL-JOINT.

1,194,283.

Specification of Letters Patent.

Patented Aug. 8, 1916.

Application filed October 23, 1915. Serial No. 57,534.

*To all whom it may concern:*

Be it known that I, ALGOT ERICKSON, a citizen of the United States, residing at Lowell, in the county of Lake and State of Indiana, have invented new and useful Improvements in Rail-Joints, of which the following is a specification.

This invention relates to improvements in means for connecting the meeting ends of railway rails, and the object of the invention is to so arrange the webs at the ends of the rails as to permit the same co-acting with the supporting lug or shoulder provided upon a fish plate, the connection between the fish plate and rails being such as to always maintain the shoulder in contact with the said ends of the webs of the rails irrespective of the longitudinal movement of the said rails incident to the expansion or contraction of the said rails so at all times to hold the heads of the rails in positive alinement.

With the above and other objects in view, the improvement resides in the construction, combination and arrangement of parts set forth in the following specification and falling within the scope of the appended claims.

Figure 1:
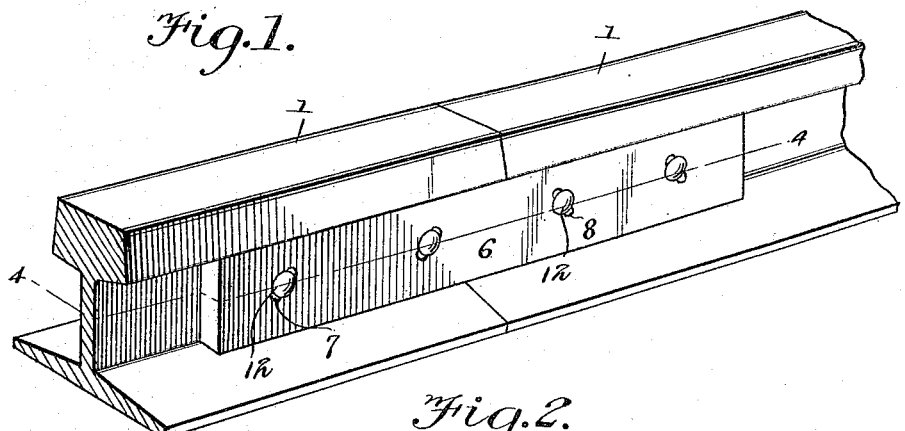
Figure 2:
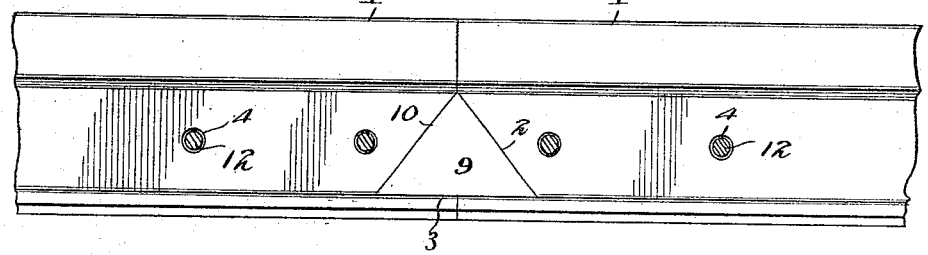
Figure 3:
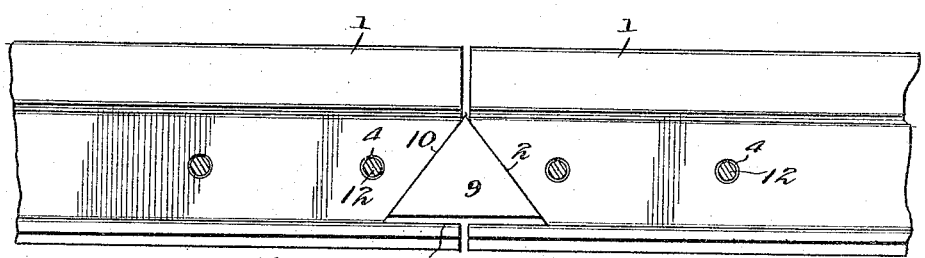
Figure 9:
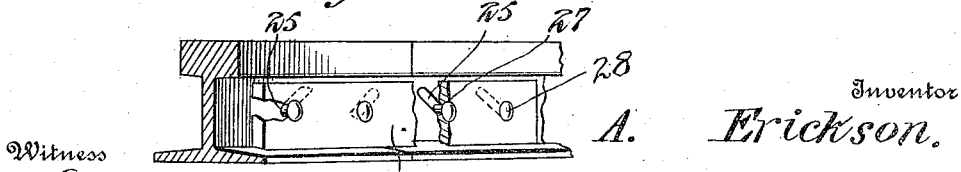

In the drawings: Figure 1 is a perspective view of two rails connected in accordance with the present invention, Fig. 2 is a side elevation, one of the fish plates being removed and showing the engaging position of the lug of the second fish plate when the rails are expanded to have their ends abutting, Fig. 3 is a similar view but illustrating the arrangement of parts when the rails are contracted and the ends spaced from each other, Fig. 4 is a horizontal sectional view approximately on the line 4—4 of Fig. 1, Fig. 5 is a transverse sectional view approximately on the line 5—5 of Fig. 4, Fig. 6 is a perspective view of one of the fish plates, and Fig. 7 is a similar view of one of the rail ends. Figs. 8 and 9 are perspective views, with parts broken away and parts being in section, illustrating modifications.

Referring now to the drawings in detail, 1—1 designate two rails of the ordinary construction. These rails, however, have their webs at the end of said rails cut inwardly or rearwardly from the head to the base providing a substantially V-shaped opening defining an angular wall 2 provided in the end of the web and a horizontally straight wall 3 provided by the central portion of the base flange of the rail. The webs of the rails are provided with the usual bolt openings 4, and fish plates 5 and 6 respectively are disposed within the fishing spaces at the opposite sides of the rails. Each of these plates 5 and 6 is provided with bolt openings arranged in series and designated by the numerals 7 and 8 respectively. The openings 7 and 8 are inclined vertically and inwardly with respect to the plates and to the rails, when the said plates are arranged upon the rails, and the series 7 are adapted to receive the bolts passing through the openings in one of the rails, while the series of openings 8 are adapted to receive the bolts passing through the second or co-acting rail. The plate 5 upon its inner face is centrally and integrally formed with a laterally extending lug 9, the opposite walls of which being inclined from the bottom of said plate to the top thereof and thus providing a substantially V-shaped member which is adapted to be received within the V-shaped opening in the ends of the rails and the angular or inclined wall 10 of said lug 9 is adapted to at all times engage with the angular ends 2 of the webs of the rails 1. It is to be understood that suitable retaining elements are provided for the securing elements, the said securing elements being, as indicated, in the nature of bolts and the retaining elements being in the nature of nuts and by the particular and peculiar arrangement of the openings 7 and 8 it will be noted that regardless of the longitudinal movement of the rails either toward or away from each other, the bolts 12 resting within the round openings 4 will force the plates 6 and 7 to ride thereon, thus at all times holding the lug in contact with the ends of the rails and effectively preventing the downward movement of said rail ends. The plate 6 comprises simply a flat member and the lug 9 is preferably of a thickness equaling the thickness of the webs of the rails, but, of course, each of the plates 5 and 6 may be provided with co-acting lugs similar to the lug 9 if desired.

It is to be understood that the lug 9 may be dispensed with if desired, in which instance it is not necessary to cut the ends of the rails. In Figs. 8 and 9 I have illustrated a slight modification embodying the above mentioned idea. In Fig. 8 the fish plates 20 are provided with angularly arranged elongated openings similar to the opening 7, and the webs of the rails provided with the usual round bolt openings. The bolts 21 serve as guide members and travel in the slots 22 in the plates 20 to cause the said plates to ride thereon to bring the upper edges of the said plates in to contact with the under face of the rails when the rails are contracted. It is, of course, to be understood that this movement is very limited, so that the lower edges of the plates will firmly rest upon the base flanges of the rails when the rails are in their expanded condition. In Fig. 9 the angular openings 25 are provided in the webs of the rails, while the plates 26 have round openings 27, bolts 28, passing through the registering openings. With this arrangement the same result is obtained as will be readily understood.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. In a rail joint, the combination with two alining rails and each of said rails having its web at its end formed with a substantially V-shaped opening, fish plates for the opposite sides of the rails, said fish plates being of a less width than the distance between the head and base of the rail, one of said plates having a central lateral lug, the end walls of which being inclined in opposite directions and engaging with the angular ends of the webs of the rails, the second plate being straight, and means for securing the plates to the rails.

2. In a rail joint, two alining rails, each having its web formed with a substantially V-shaped depression at its end, fish plates of a less width than the distance between the head and base of the rails arranged one upon each of the sides of the rails, one of said fish plates having a central lateral lug, the opposite walls of which being inclined downwardly in opposite directions, said inclined walls engaging with the angular ends of the rail webs, means for securing the plates to the rails, and means actuated by said securing means for forcing the lug against the end walls of the webs of the rails to support the latter irrespective of the longitudinal movement of the rails.

3. In a rail joint, two registering rails, each having its web at its end cut to provide an angular opening, fish plates for the opposite sides of the rails, said fish plates being of a less width than the distance between the heads and webs of the rails, one of said fish plates being provided with a lateral lug which conforms to the opening in the ends of the rails and engaging with the side walls thereof, the said plates having bolt openings arranged in series, each of said series registering with the series of openings in the respective rails and each series being inclined toward the end of said respective rails, and securing elements passing through the said openings.

In testimony whereof I affix my signature in presence of two witnesses.

ALGOT ERICKSON.

Witnesses:
VICTOR K. ROBERTS,
HENRI HAYDEN.

Copies of this patent may be obtained for five cents each, by addressing the "Commissioner of Patents, Washington, D. C."